United States Patent
Boswell, Jr. et al.

(10) Patent No.: US 6,499,050 B1
(45) Date of Patent: *Dec. 24, 2002

(54) MEANS USED TO ALLOW DRIVER SOFTWARE TO SELECT MOST APPROPRIATE EXECUTION CONTEXT DYNAMICALLY

(75) Inventors: Charles Ray Boswell, Jr.; Terry Lynn Cole; David Mason Kaplowitz, all of Austin, TX (US)

(73) Assignee: Advanced Micro Devices, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 38 days.

(21) Appl. No.: 09/094,183

(22) Filed: Jun. 9, 1998

(51) Int. Cl.⁷ .................................................. G06F 9/00
(52) U.S. Cl. ...................................... 709/107; 709/321
(58) Field of Search ................................. 709/105, 103, 709/321–327, 100–108; 710/260, 267, 268, 269; 712/228, 229, 244

(56) References Cited

U.S. PATENT DOCUMENTS

| | | | | |
|---|---|---|---|---|
| 5,057,997 A | * | 10/1991 | Chang et al. ................. | 714/34 |
| 5,187,791 A | * | 2/1993 | Baum ........................... | 710/268 |
| 5,297,282 A | * | 3/1994 | Meilak et al. ............... | 710/260 |
| 5,517,643 A | * | 5/1996 | Davy ........................... | 709/105 |
| 5,537,595 A | * | 7/1996 | Sakata ......................... | 709/105 |
| 5,687,381 A | * | 11/1997 | Swanstrom et al. ........ | 710/269 |
| 5,696,976 A | * | 12/1997 | Nizar et al. ................. | 710/266 |
| 5,907,712 A | * | 5/1999 | Slane ........................... | 710/269 |
| 5,944,840 A | * | 8/1999 | Lever .......................... | 714/34 |
| 5,948,093 A | * | 9/1999 | Swanstrom et al. ........ | 710/267 |
| 5,953,535 A | * | 9/1999 | Brech .......................... | 710/260 |

OTHER PUBLICATIONS

Silberschatz et al. "Operating System concept", 1994, pp. 141–143.*

* cited by examiner

Primary Examiner—St. John Courtenay, III
Assistant Examiner—Van H Nguyen
(74) Attorney, Agent, or Firm—Conley, Rose & Iayon, PC; B. Noel Kivlin

(57) ABSTRACT

A mechanism for minimizing interrupt context execution in a computer system by providing means for a driver to select the context for its execution. The operating system determines the system processing load and stores this information for use by the driver software. Based on the system processing load information, each driver then selects an execution context which meets its particular service requirements. When the system processing load is low and a lower-priority context will provide adequate service to the application, the lower-priority context is selected in order to reduce the amount of interrupt context execution. When the system processing load is high and a lower-priority context may not provide adequate service to the application, a higher-priority context is selected in order to ensure that execution of the application is within the driver's latency requirements.

19 Claims, 3 Drawing Sheets

MEANS USED TO ALLOW DRIVER SOFTWARE TO SELECT MOST APPROPRIATE EXECUTION CONTEXT DYNAMICALLY

BACKGROUND OF THE INVENTION

1. Field of the Invention

The invention relates generally to device drivers and more particularly to means for allowing a device driver to determine the system processing load of a computer on which it is executing and to select an execution context which meets latency constraints and at the same time reduces use of the interrupt context for execution.

2. Description of the Relevant Art

As a result of the increased performance of microprocessors and memory systems, there are an increasing number of opportunities to develop software applications. The software applications that have been developed to take advantage of these opportunities have included not only what might be considered more traditional software applications, but also applications which emulate or take over functions traditionally implemented in hardware. These applications utilize the microprocessor of a host computer system to perform the algorithm associated with the hardware. By taking advantage of the extra processing power available in current computer systems, software implementations can reduce the cost of the modem components in these systems.

A modem is one example of computer system component which can be implemented in software. Software modems may provide various advantages over hardware modems. Software designs may be more easily changed than hardware designs. Likewise, it may be easier to update the software designs and to provide the updates to users. Applications such as software modems, however, may present complications which do not arise from typical software applications. For instance, modem applications must operate in real-time and must operate under particular latency constraints with respect to the analog converter which is used to interface with the telephone line. Further, modem applications generally require a large portion of the processing time available in the system. The same is true for many other types of software solutions to traditional hardware problems ("soft solutions"), including multimedia, telephony and data communication applications which need real-time servicing by the operating system.

As additional applications are executed, dynamic loading of the system increases. This loading may include increased use of device drivers (e.g., disk drivers.) The additional applications thus compete with the soft solutions for use of these drivers and the resources with which they are associated. At the start of execution, applications may require disk accesses to load the executable code. During subsequent execution, data may be needed by the application, resulting in further disk accesses. System loading may increase as a result of computation-intensive applications because of their high processor and data storage utilization.

Likewise, if a user adds new devices to a computing system, new driver software is also added. The additional utilization of existing and added drivers reduces the amount of processing time which is available to individual applications and drivers. In a heavily loaded system, the system's ability to provide real-time service to each of the drivers and applications may be impaired. Therefore, applications which require a great deal of processing time, such as those which implement traditional hardware functions, may seriously degrade system performance.

Producers of the individual drivers and the soft solution applications must nevertheless rely on the operating system to provide service to this software in real time. The operating system must therefore perform with a high degree of determinism. That is, the operating system must be very predictable in terms of providing adequate processing time to support real-time performance in the many applications which may be sharing the host processor's available processing bandwidth. This requires a mechanism by which the applications can be processed in the background while still providing sufficient service to the applications to allow real-time performance.

An operating system typically uses a process level context (also referred to as passive context or background context) and an interrupt context. The interrupt context may include several levels of priority, so that interrupts having the highest level of priority are executed first, then interrupts of the next lower level, and so on. Routines using the interrupt context are executed before routines in the process level context. Real-time routines which use these operating systems execute in the interrupt context in order to ensure that they are serviced by the operating system in a timely manner. The routines must execute in the interrupt context even if they could be adequately serviced at the process level. Because of the potentially great number of routines which may be competing for service at a given time, it would be desirable to provide a means to reduce the number of interrupt routines demanding processing time. Also, because a real-time routine executing at a particular interrupt level may be preempted by an interrupt routine executing at a higher priority level, the first routine still may not receive real-time service.

One example of a mechanism which has been employed to reduce the number of interrupt-level routines is the use of an additional context level. One operating system includes a deferred procedure call (DPC.) This is also referred to as a deferred processing context or DPC context. The DPC context has a higher level of priority than the process context, but a lower priority than the interrupt context. Execution contexts between process-level and interrupt contexts will be referred to herein as DPC contexts.

The DPC context is intended to provide a means for time-critical scheduling to take precedence over process-level tasks, yet still reduce interrupt context processing. The DPC context, however, cannot guarantee timely execution of routines. For example, the DPC mechanism of Windows NT (a trademark of Microsoft Corp.) executes routines in first-in-first-out (FIFO) order. A poorly written routine can spend an excessive amount of time executing in the DPC context, causing other DPC-scheduled routines to be delayed. As a result, the real-time performance of an application associated with one of the delayed routines can be destroyed. Therefore, because the DPC mechanism may be unreliable, it may still be necessary to execute the routine in the interrupt context.

SUMMARY OF THE INVENTION

The present invention provides a means by which drivers can select the context in which they execute. The drivers can dynamically select the context based on the current system processing load. A higher-priority context can be selected to overcome background scheduling latencies when the driver requires immediate servicing. A lower-priority context can be selected when the driver does not require immediate servicing, thereby freeing processing time for other drivers or applications which otherwise would defer to the driver.

Information relating to the system processing load is read from the computing system. This information may be latency data for routines executing in a non-interrupt context or it may be other system loading data. It is determined from this information whether or not a driver executing in a non-interrupt context will be serviced in a timely manner. If the non-interrupt context will provide timely service, the driver is scheduled to execute in this context. The non-interrupt context may be one of several such contexts. If the non-interrupt context will not provide timely service, the driver is executed in interrupt context.

BRIEF DESCRIPTION OF THE DRAWINGS

Other objects and advantages of the invention will become apparent upon reading the following detailed description and upon reference to the accompanying drawings in which.

Figure 1:
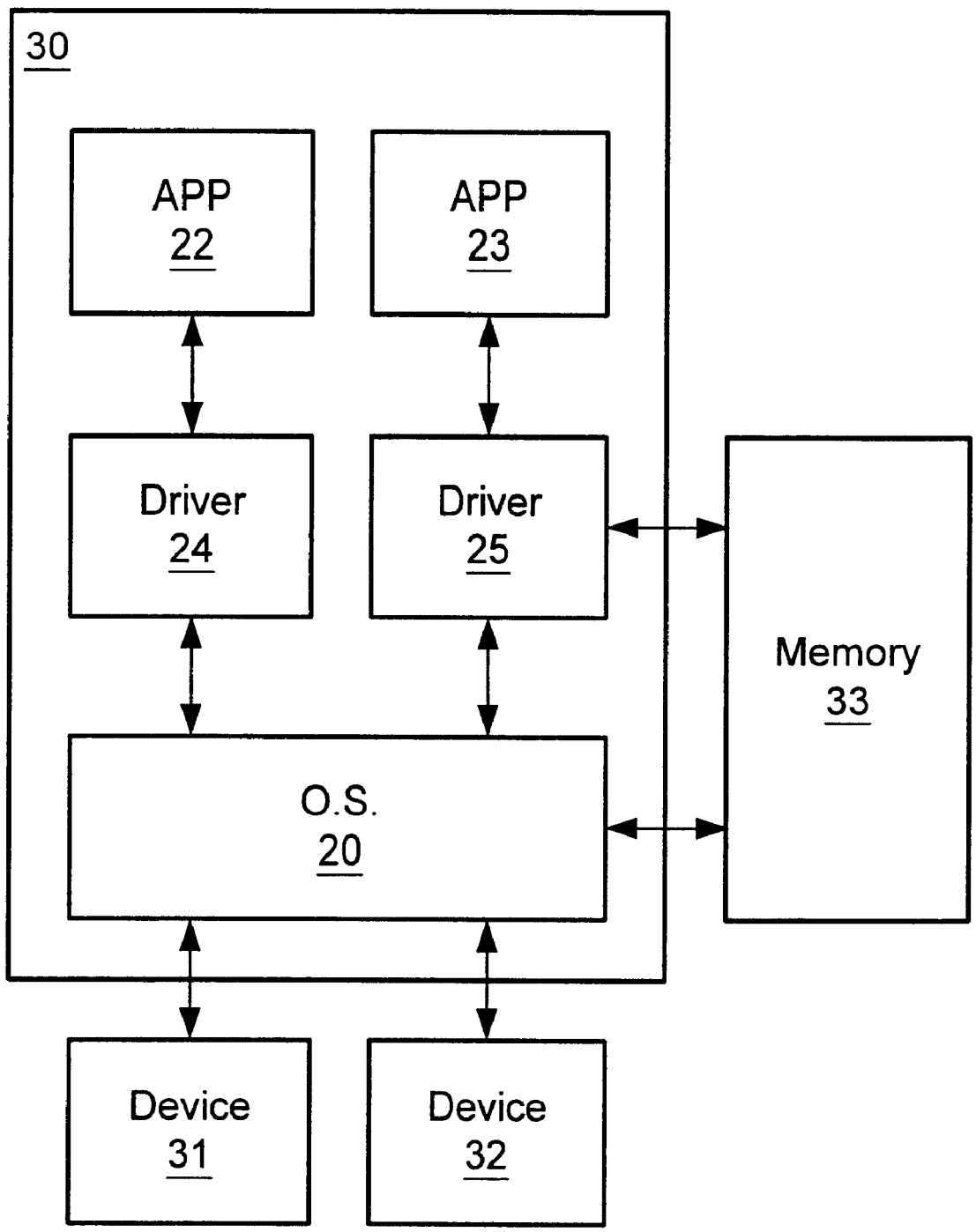
FIG. 1 is a block diagram illustrating a computer system in which the invention is implemented.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

One embodiment of the invention is a mechanism for minimizing interrupt-context execution within a computer system while ensuring timely delivery of service by the computer's operating system. The mechanism is implemented in the operating system and in device driver software which requires periodic service from the operating system. The operating system determines the system processing load and stores this information for use by the driver software. Based on the system processing load (which is indicative of the reliability of the background scheduling mechanism,) each driver then selects an execution context which meets its particular service requirements. The context is selected so as to minimize interrupt context execution in the computer system. When the system processing load is low and a lower-priority context will provide adequate service to the application, the lower-priority context is selected in order to reduce the amount of interrupt context execution. When the system processing load is high and a lower-priority context may not provide adequate service to the application, a higher-priority context is selected in order to ensure that execution of the application is within the driver's latency requirements.

Referring to FIG. 1, a diagram illustrating a computer system in which the invention is implemented is shown. The computer system includes microprocessor 30, peripheral devices 31 and 32 and memory 33. Applications 22 and 23 are executed on the computer system under operating system 20. When applications 22 and 23 need service from devices 31 or 32, the applications execute driver software 24 or 25. (Although the figure simply shows that application 22 executes driver 24 and application 23 executes driver 25, it will be understood by a person of ordinary skill in the art that each application may access a number of drivers and that a given driver can be executed by more than one application.)

When an application executes a driver, the driver does not immediately make a system call to request service. The driver first checks memory 33 to determine whether data in the memory indicates that the driver should execute in interrupt context or in DPC context. This data is periodically stored by a routine in operating system 20. This routine checks the system loading, makes a determination of whether or not the system is heavily loaded so that time critical routines must execute in interrupt context. If the system is not heavily loaded, time critical routines can be timely serviced in DPC context. The operating system therefore stores the appropriate data in memory 33. If the data indicates that the system is heavily loaded, the driver will execute in interrupt context in order to meet its latency requirements. The driver will make a system call to the operating system, which will in turn request service from the appropriate device and then provide service to the application when it is received from the device. If, on the other hand, the data in memory 33 indicates that the system is not heavily loaded, the driver will be scheduled in DPC context and will execute after any interrupt requests and any previously scheduled DPC routines.

Figure 2:
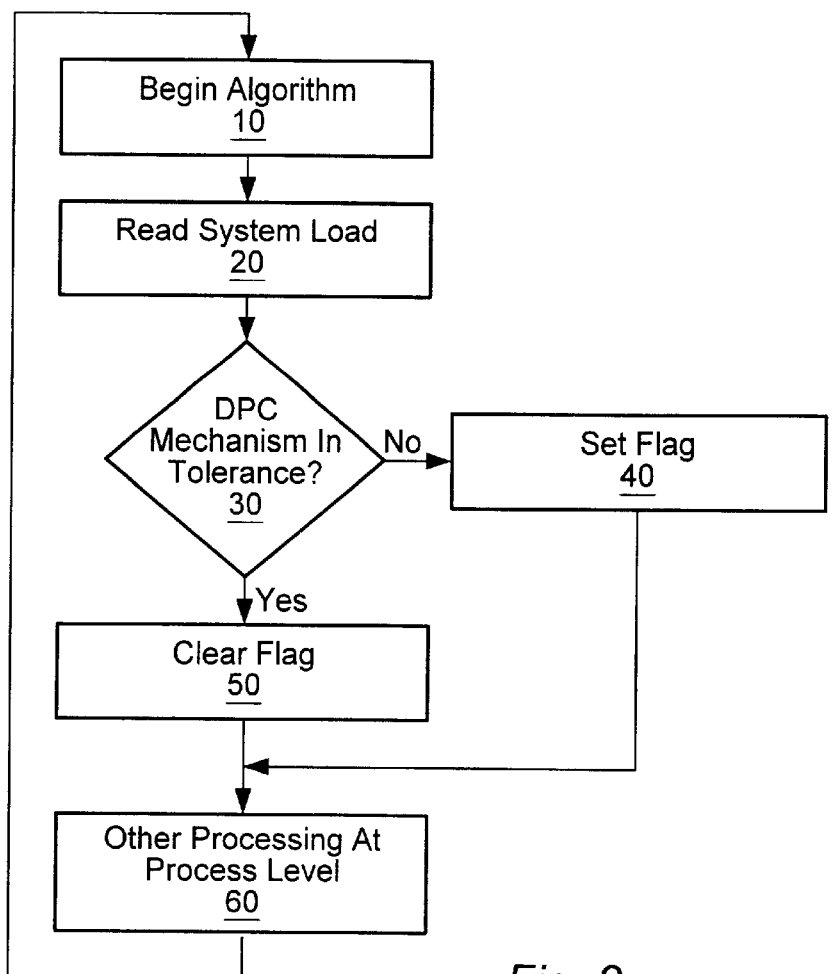
FIG. 2 is a flow diagram illustrating the algorithm which is implemented in the operating system for checking the system load.

Referring to FIG. 2, a block diagram is shown to illustrate the algorithm which is implemented in the operating system for checking the system load. The operating system enters the algorithm 10 and proceeds to read the system load 20. The operating system tests the system load 30 and determines whether the DPC mechanism is within tolerance. "Within tolerance," as used here, means that the DPC latency is expected to be low enough that time critical routines may be executed in DPC context without violating the routines' latency requirements. DPC latency is the amount of time between the scheduling of a routine in the DPC context and the beginning of actual execution of the routine. The DPC latency is calculated by the operating system. This check of the system load may incorporate a complex set of rules by which the DPC mechanism is determined to be in or out of tolerance. In one embodiment, the algorithm employs DPC latency histograms to determine whether the mechanism is in tolerance. The algorithm may, on the other hand, use a very simple method for estimating expected DPC latency if less accuracy is required. For example, the algorithm may be as simple as comparing the maximum DPC latency to a predetermined value and determining that the DPC mechanism is in tolerance if it is less than the predetermined value and out of tolerance if greater. If it is determined that the DPC mechanism is out of tolerance, a flag is set 40, indicating that time critical routines should be executed in interrupt context to ensure that they are serviced in a timely manner. The setting of this flag may comprise setting a bit or word to a particular value, or it may comprise any other suitable means for indicating that the DPC mechanism is out of tolerance. If it is determined that the DPC mechanism is instead found to be within tolerance, the flag is cleared 50 to indicate that time critical routines may be safely executed in the DPC context.

Figure 3:
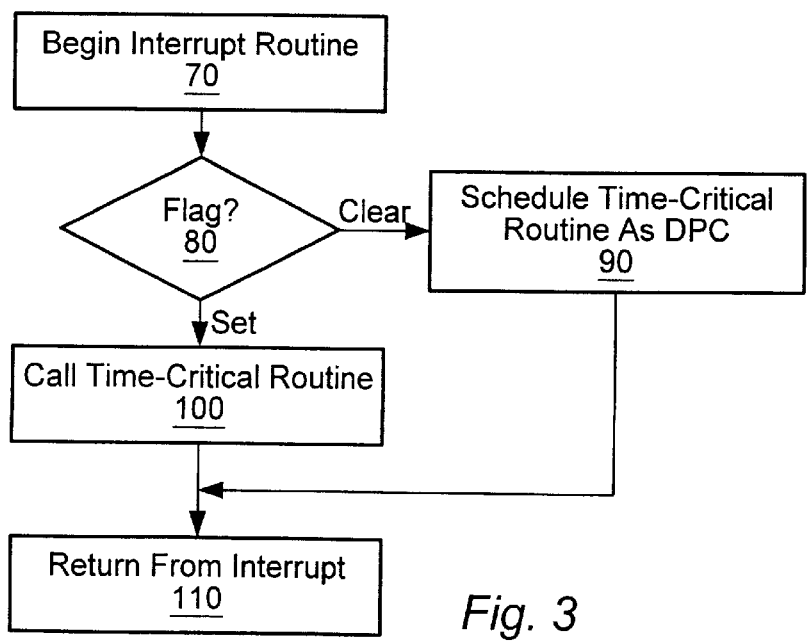
FIG. 3 is a flow diagram illustrating the algorithm which is implemented in the driver interrupt routine to select an appropriate execution context.

When an application executes a time critical routine which requires service from one of the devices in the system, the driver executes an interrupt routine to set the execution context at which the routine will execute. FIG. 3 is a block diagram illustrating an algorithm implemented in the driver interrupt routine for this purpose. After the interrupt routine is started 70, the routine checks the flag indicating whether the DPC mechanism is within tolerance 80. If the flag is clear, the DPC mechanism is within tolerance, so it is expected that the time critical routine can be serviced in a timely manner in the DPC context. The time critical routine is therefore scheduled for DPC-context execution 90. After the routine is scheduled, the interrupt routine returns control to the driver 110. If the flag is set when the interrupt routine checks it, this indicates that the DPC mechanism was out of tolerance when last checked. The DPC mechanism thus cannot be expected to provide timely service to the time critical routine. The time critical routine is therefore called by the interrupt routine 100 rather than being given to the DPC scheduler. Since the interrupt routine is executing in interrupt context, the time critical routine which it calls will also be executed in the interrupt context.

The above described embodiment allows the selection of two possible execution contexts. Other embodiments may allow the selection of additional contexts. For example, the driver may select the passive context as well as interrupt or DPC contexts. The testing of the system load may accordingly recognize intermediate levels of system loading rather than simply determining whether the DPC mechanism is in tolerance or out of tolerance.

Figure 4:
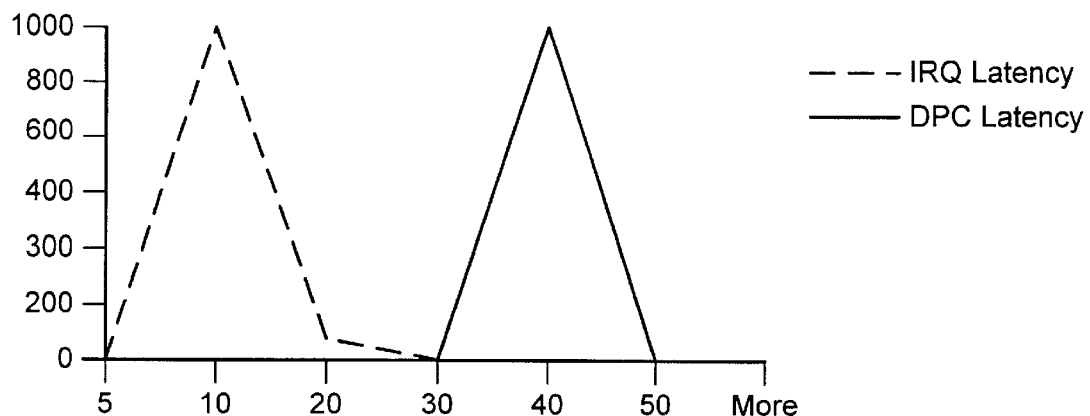
FIG. 4 is a latency histogram for routines in both the DPC and interrupt contexts during execution of an idle modem application.

As mentioned above, one embodiment makes use of DPC latency time to determine whether to select interrupt- or DPC-context execution. The operating system calculates and maintains a histogram of the DPC latency for use by the driver. (Although the calculation and maintenance of the histogram data are believed to be more efficiently implemented in the operating system, it is contemplated that these functions could also be implemented in the driver itself.) FIG. 4 is an example of a latency histogram for a routine executing in both the DPC and interrupt contexts. Table 1 shows several statistical measures of the data illustrated in the figure. It can be seen from FIG. 4 and Table 1 that, on the average, execution of the routine in DPC context can be expected to be delayed by 37 microseconds from the time the routine is scheduled, while execution of the routine in interrupt context can be expected to be delayed by only 7 microseconds. It can also be seen that, among the sampled routines, the maximum latency in the interrupt context was 23 microseconds, while the maximum DPC latency was 829 microseconds. The latencies of routines executing in DPC context are longer than the latencies of interrupt-context routines because the interrupt context has a higher priority. DPC-context routines are therefore suspended until execution of pending interrupt-context routines is complete.

TABLE 1

|  | Interrupt context | DPC context |
| --- | --- | --- |
| Mean | 7 | 37 |
| Mode | 7 | 36 |

TABLE 1-continued

|  | Interrupt context | DPC context |
| --- | --- | --- |
| Standard deviation | 2 | 25 |
| Minimum | 5 | 35 |
| Maximum | 23 | 829 |

Figure 5:
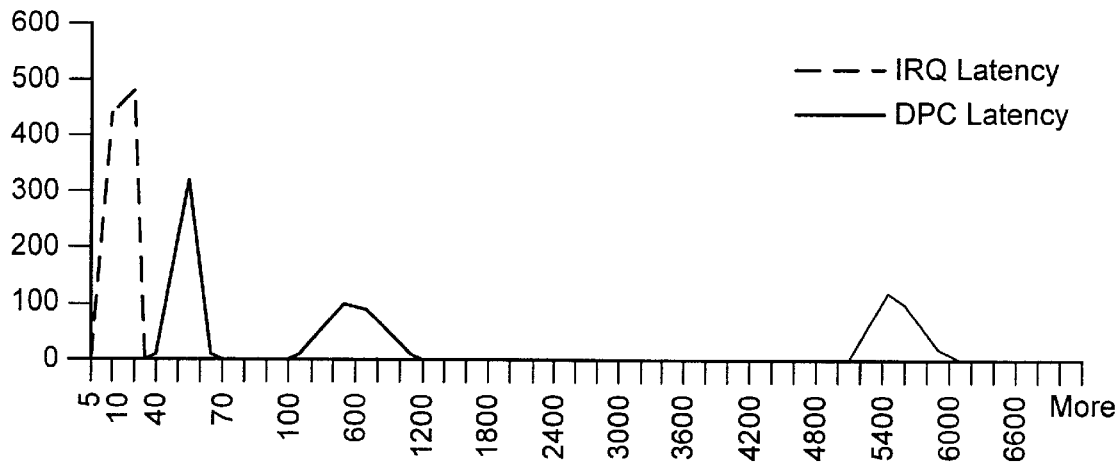
FIG. 5 is a latency histogram for routines in both the DPC and interrupt contexts during steady state execution of a modem application.

FIG. 4 depicts DPC and interrupt latencies when a single, idle modem application is executing on a computer system. FIG. 5 shows interrupt and DPC latency histograms for the same modem application when the application is operating at a steady state. Table 2 shows the statistical measures of the data illustrated in the figure. It can be seen from FIG. 5 and Table 2 that the latencies in the interrupt context increase slightly. The latencies in the DPC context, while showing only a slight increase in the first modal point, also have groupings around 500 microseconds and 5500 microseconds. If it is assumed that sampling circuitry which provides data to the modem application requires service from the operating system every 10 milliseconds, it is apparent that the driver for the sampling circuitry could execute in either the DPC context or the interrupt context. Either context would provide adequate service to allow the modem to operate in real time. If, on the other hand, the sampling circuitry required service every 1 millisecond, there is a good chance that the circuitry would not be timely serviced, so it would be necessary to execute in the interrupt context.

TABLE 2

|  | Interrupt context | DPC context |
| --- | --- | --- |
| Mean | 10 | 1945 |
| Mode | 11 | 42 |
| Standard deviation | 2 | 2465 |
| Minimum | 7 | 39 |
| Maximum | 18 | 6557 |

Figure 6:
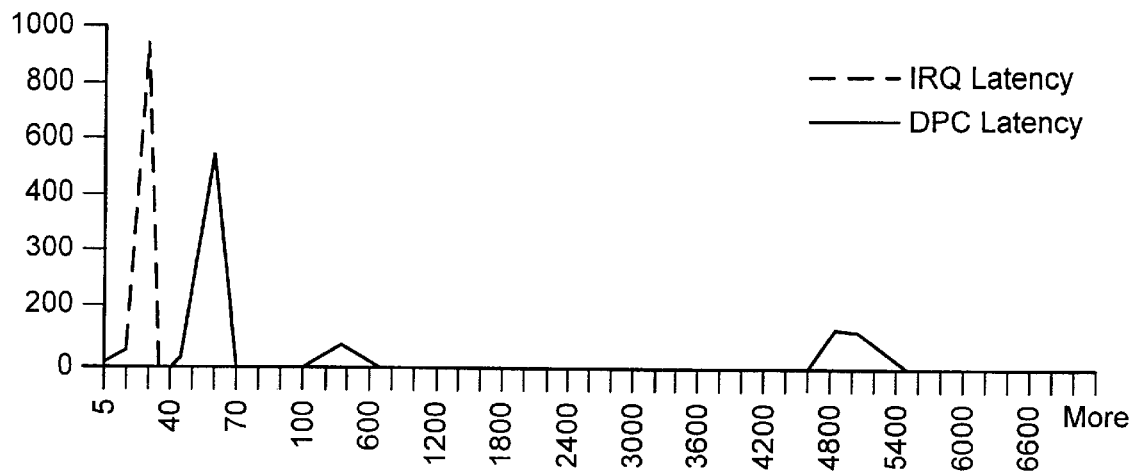
FIG. 6 is a latency histogram for routines in both the DPC and interrupt contexts during a file download of a modem application.

FIG. 6 depicts DPC and interrupt latencies when the modem application is downloading a file. Table 3 shows the statistical measures of the data illustrated in the figure. It can be seen from the figure that the DPC and interrupt latencies have modal points at approximately the same locations as the steady state figure, but many of the sampled routines have shifted from around 500 microseconds to around 5500 microseconds. If additional applications (and device drivers servicing the applications) were executing, this shift would likely continue and even cause the 5500 microsecond modal point to shift to an increased latency. The figures therefore show that a driver which in one case receives adequate service in a DPC context may not receive adequate service in a second case, forcing the driver software developer to either statically assign the driver to execute in interrupt context or allow the driver to choose between the contexts in order to ensure adequate service.

TABLE 3

|  | Interrupt context | DPC context |
| --- | --- | --- |
| Mean | 13 | 1732 |
| Mode | 14 | 43 |
| Standard deviation | 2 | 2336 |
| Minimum | 9 | 40 |
| Maximum | 32 | 6125 |

As mentioned above, information on the system processing load can be acquired and maintained by the operating system or it by the driver itself. The system processing load can be determined through measurement of DPC latency, interrupt utilization of the microprocessor, or process level utilization of the microprocessor.

In the DPC context, the latency of routines can be determined directly. Routines which are executed in the DPC context are scheduled by the operating system dispatcher or background scheduler mechanism in FIFO order. Routines in the DPC context are scheduled to be executed before process-level routines, but are subject to suspension when interrupt-context routines need to be executed. The driver algorithm can measure the latency of the background scheduler in DPC context using elapsed timers or host microprocessor assets. This measurement provides a very good basis for estimating the expected latency of a routine which is about to be scheduled. DPC latency normally changes with the microprocessor loading, and changes in the loading can conversely be used to determine changes in DPC latency. Higher loading indicates that the DPC latencies will be higher, while lighter loading indicates shorter latency.

In the interrupt context, all processes other than the highest priority interrupt subroutine are suspended. This interrupt subroutine is then executed. In a modem algorithm, which is a sampled-data algorithm, the interrupts from the sampling circuitry are generated at regular intervals. The modem can determine the interrupt rate, or it may have a priori knowledge of the interrupt rate. The modem algorithm can also measure the amount of time which is spent in the interrupt context (and the average per interrupt,) either by using external elapsed timers or by using assets of the host microprocessor. From the interrupt rate and average time spent in the interrupt context, the modem algorithm can calculate the microprocessor utilization.

The microprocessor loading can further be measured in the process level or passive context. The process level context has the lowest priority and can be suspended for either DPC-context or interrupt-context routines. The microprocessor is considered to be executing in process level context whenever it is not executing in DPC or interrupt contexts. By measuring the percentage of the microprocessor's time which is spent executing in the process level context, the percentage of time available for DPC and interrupt context processing can be determined.

By measuring the percentage of time which is spent in the interrupt and passive contexts, a time-critical routine can accurately determine the system loading. In the presence of a given level of loading, the routine can select either the DPC context or the interrupt context, depending on whether the operating system can provide reliable service in the DPC context. If the DPC context is adequate (e.g., DPC latency is low and the routine can be serviced in a timely manner,) the DPC context will be selected. This allows routines which require more immediate service to obtain it through interrupt-level processing. If the DPC context appears to be inadequate to timely service the routine, the interrupt context will be selected for execution of the routine. To the extent that the drivers are capable of selecting their execution context, the interrupt level execution will be minimized.

While the present invention has been described with reference to particular embodiments, it will be understood that the embodiments described above are illustrative and that the scope of the invention is not limited to these embodiments. Many variations, modifications, additions and improvements to the described embodiments are possible. These variations, modifications, additions and improvements are intended to be within the scope of the invention as detailed within the following claims.

What is claimed is:

1. A method for reducing interrupt context execution in a computer system, the method comprising:
   determining a system load of said computer system;
   determining whether a non-interrupt context will provide timely service to a driver routine under said system load;
   storing data to a memory indicative of whether said non-interrupt context will provide timely service to said driver routine under said system load;
   reading said data from memory;
   said driver routine selecting said non-interrupt context as a selected context for said driver routine if said data is indicative that said non-interrupt context will provide timely service to said driver routine under said system load;
   said driver routine selecting an interrupt context as said selected context for said driver routine if said data is indicative that said non-interrupt context will not provide timely service to said driver routine under said system load; and
   executing at least a portion of said driver routine in said selected context.

2. The method of claim 1 wherein said determining said system load is performed by an operating system.

3. The method of claim 2, further comprising storing data indicative of said system load, and wherein said determining whether said non-interrupt context will provide timely service comprises said driver reading said data and determining whether said non-interrupt context will provide timely service to said driver based on said data.

4. The method of claim 3 wherein said data indicative of said system load comprises a flag and wherein said flag is set if said non-interrupt context will not provide timely service and wherein said flag is cleared if said non-interrupt context will provide timely service.

5. The method of claim 4 wherein said driver comprises an interrupt routine and a time critical routine, wherein said interrupt routine is configured to read said flag, said interrupt routine being configured to schedule said time critical routine for non-interrupt execution if said flag is cleared and to execute said time critical routine in interrupt context if said flag is set.

6. The method of claim 3 wherein said data indicative of said system load comprises a histogram of latencies in said non-interrupt context.

7. The method of claim 3 wherein said non-interrupt context comprises a DPC context and a process level context.

8. The method of claim 1 wherein said determining said system load is performed by said driver.

9. The method of claim 1 wherein said determining said system load comprises measuring latencies in said non-interrupt context.

10. The method of claim 1 wherein said determining said system load comprises measuring microprocessor utilization in one of: said interrupt context; and said non-interrupt context.

11. A mechanism for minimizing interrupt-context execution in a computer system comprising:
   an operating system implemented in a microprocessor, said operating system being configured to determine a system load of said computer system and to store data indicative of whether a non-interrupt context will provide timely service to a driver routine under said system load in a memory; and a driver executing on said microprocessor, said driver being configured to read said data from said memory and to select one of a plurality of execution contexts based on said data.

12. The mechanism of claim 11 wherein said execution contexts comprise an interrupt context and one or more non-interrupt contexts, and wherein said data comprises latency information for one of said non-interrupt contexts.

13. The mechanism of claim 12 wherein said latency information comprises histogram data.

14. The mechanism of claim 13 wherein said latency information comprises a flag indicative of whether said latency is within a predetermined tolerance.

15. The mechanism of claim 14 wherein said driver selects said interrupt context if said flag is set and wherein said driver selects one of said non-interrupt contexts if said flag is cleared.

16. The mechanism of claim 15 wherein said driver comprises an interrupt routine and a time critical routine, wherein said interrupt routine is configured to read said flag, said interrupt routine being configured to schedule said time critical routine to execute in one of said non-interrupt contexts if said flag is cleared and to execute said time critical routine in said interrupt context if said flag is set.

17. The mechanism of claim 16 wherein said microprocessor is configured to determine said system load by measuring said latency in one of said non-interrupt contexts.

18. The mechanism of claim 16 wherein said microprocessor is configured to determine said system load by measuring microprocessor utilization in one of said non-interrupt contexts.

19. A mechanism in a computer system for enabling a device driver to select an execution context based on system loading, comprising:

means for measuring system loading in said computer system;

means for storing data indicative of said system loading;

means for reading said data indicative of said system loading;

means for determining whether a non-interrupt context will provide timely service to a driver under said system loading; and means for selecting said execution context by said driver.

* * * * *